United States Patent
Adamczyk et al.

(10) Patent No.: US 10,411,616 B2
(45) Date of Patent: Sep. 10, 2019

(54) CONTROLLING A POWER TRANSMISSION NETWORK

(71) Applicant: General Electric Technology GmbH, Baden (CH)

(72) Inventors: Andrzej Adamczyk, Stafford (GB); Carl David Barker, Walton Stone (GB); Robert Stephen Whitehouse, Walton on the Hill (GB)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 15/559,538

(22) PCT Filed: Mar. 17, 2016

(86) PCT No.: PCT/EP2016/055809
§ 371 (c)(1),
(2) Date: Sep. 19, 2017

(87) PCT Pub. No.: WO2016/146747
PCT Pub. Date: Sep. 22, 2016

(65) Prior Publication Data
US 2018/0097365 A1  Apr. 5, 2018

(30) Foreign Application Priority Data
Mar. 19, 2015 (EP) .................................. 15275079

(51) Int. Cl.
*H02M 7/75* (2006.01)
*H02J 3/36* (2006.01)
(Continued)

(52) U.S. Cl.
CPC ............. *H02M 7/7575* (2013.01); *H02J 3/36* (2013.01); *H02J 3/386* (2013.01); *H02M 1/32* (2013.01); *Y02E 10/763* (2013.01); *Y02E 60/60* (2013.01)

(58) Field of Classification Search
CPC .............................. H02M 1/32; H02M 7/7575
See application file for complete search history.

(56) References Cited

U.S. PATENT DOCUMENTS 3,825,732 A * 7/1974 Haley ...................... G06G 7/06
703/18
9,331,565 B2 * 5/2016 Wei ......................... H02M 1/36
(Continued)

FOREIGN PATENT DOCUMENTS

EP  2528184 A1  11/2012

OTHER PUBLICATIONS

International Search Report and Written Opinion issued in connection with corresponding PCT application No. PCT/EP2016/055809 dated May 30, 2016.

*Primary Examiner* — Yusef A Ahmed
(74) *Attorney, Agent, or Firm* — Eversheds Sutherland (US) LLP (57) ABSTRACT

A power transmission network includes an AC electrical system, an AC transmission link from the AC electrical system to AC-DC converter(s), and a control system. AC-DC converter(s) include an AC connecting point connected to the AC transmission link and a DC connecting point for connection to a DC transmission link. The control system operates each AC-DC converter in an AC voltage control mode as an AC slack bus to control a magnitude and/or a frequency of an AC voltage of the AC transmission link at a steady-state value and facilitating a power transfer between its connecting points to accommodate power generated or supplied to the AC electrical system. The control
(Continued)

system further operates each AC-DC converter in a protection mode to protect each AC-DC converter from an overvoltage and/or an overcurrent.

7 Claims, 3 Drawing Sheets

(51) Int. Cl.
*H02M 7/757* (2006.01)
*H02M 1/32* (2007.01)
*H02J 3/38* (2006.01)

(56) References Cited

U.S. PATENT DOCUMENTS

| | | | |
|---|---|---|---|
| 9,350,261 B2* | 5/2016 | Komatsu | H02J 3/386 |
| 9,748,860 B2* | 8/2017 | Wu | H02M 1/36 |
| 9,819,188 B1* | 11/2017 | Pan | H02J 3/36 |
| 9,859,807 B2* | 1/2018 | Adamczyk | H02J 1/02 |
| 2007/0121354 A1* | 5/2007 | Jones | H02M 5/4585 |
| | | | 363/47 |
| 2009/0279328 A1* | 11/2009 | Jiang-Hafner | H02J 3/36 |
| | | | 363/35 |
| 2010/0085783 A1* | 4/2010 | Jiang-Hafner | H02M 5/4505 |
| | | | 363/35 |
| 2011/0170323 A1* | 7/2011 | Fulcher | H02J 3/38 |
| | | | 363/65 |
| 2011/0221280 A1* | 9/2011 | Delmerico | H02J 3/386 |
| | | | 307/151 |
| 2012/0205981 A1* | 8/2012 | Varma | H02J 3/01 |
| | | | 307/64 |
| 2012/0250371 A1* | 10/2012 | Fischer De Toledo | H02J 3/16 |
| | | | 363/35 |
| 2012/0300510 A1* | 11/2012 | Jensen | H02J 3/36 |
| | | | 363/35 |
| 2013/0016541 A1* | 1/2013 | Norrga | H02J 3/36 |
| | | | 363/52 |
| 2013/0128630 A1* | 5/2013 | Jensen | H02J 3/36 |
| | | | 363/35 |
| 2013/0170255 A1* | 7/2013 | Mukherjee | H02J 3/36 |
| | | | 363/35 |
| 2013/0187384 A1 | 7/2013 | Li | |
| 2014/0001759 A1* | 1/2014 | Gupta | H02J 3/386 |
| | | | 290/44 |
| 2014/0008912 A1* | 1/2014 | Gupta | H02J 3/386 |
| | | | 290/44 |
| 2014/0239724 A1* | 8/2014 | Ishikawa | H02J 3/32 |
| | | | 307/66 |
| 2014/0316604 A1* | 10/2014 | Ortjohann | H02J 3/381 |
| | | | 700/298 |
| 2014/0347897 A1* | 11/2014 | Broussard | H02J 3/36 |
| | | | 363/35 |
| 2015/0028786 A1* | 1/2015 | Schiffmann | H02M 5/458 |
| | | | 318/494 |
| 2015/0029621 A1* | 1/2015 | Giannoccaro | H02J 3/36 |
| | | | 361/54 |
| 2015/0042092 A1* | 2/2015 | Nelson | H02J 3/386 |
| | | | 290/44 |
| 2015/0171741 A1* | 6/2015 | Sastry | H02M 1/4233 |
| | | | 363/40 |
| 2015/0249402 A1* | 9/2015 | Wijekoon | H02M 1/12 |
| | | | 363/45 |
| 2015/0333647 A1* | 11/2015 | Son | H02M 5/44 |
| | | | 363/35 |
| 2016/0126858 A1* | 5/2016 | Wu | H02M 1/36 |
| | | | 363/89 |
| 2016/0197558 A1* | 7/2016 | Whitehouse | H02M 7/483 |
| | | | 363/35 |
| 2016/0276948 A1* | 9/2016 | Adamczyk | H02J 1/02 |
| 2016/0336749 A1* | 11/2016 | Barker | H02J 3/36 |
| 2017/0054301 A1* | 2/2017 | Fintzos | H02J 3/386 |
| 2017/0126008 A1* | 5/2017 | Shen | H02J 3/36 |
| 2017/0257046 A1* | 9/2017 | Schnetzka | H02P 9/42 |
| 2018/0013280 A1* | 1/2018 | Barker | H02H 3/066 |

* cited by examiner

CONTROLLING A POWER TRANSMISSION NETWORK

FIELD OF THE INVENTION

This invention relates to a power transmission network and, in particular, a high voltage power transmission network.

BACKGROUND OF THE INVENTION

In power transmission networks alternating current (AC) power is converted to direct current (DC) power for transmission via overhead lines and/or under-sea cables. This conversion to DC power removes the need to compensate for the AC capacitive load effects imposed by the power transmission medium, i.e. the transmission line or cable, and reduces the cost per kilometer of the lines and/or cables, and thus becomes cost-effective when power needs to be transmitted over a long distance. A converter, such as a voltage source converter, provides the required conversion between AC power and DC power within the network.

A typical such power transmission network includes AC-DC converters, which are connected via a DC transmission link and are arranged to interconnect an AC electrical system and a DC electrical network.

U.S. 2010/085783 describes a method and a system to influence the power generation of at least one adjustable speed generator. The system includes a first voltage source converter connected to a local AC bus. The local AC bus is provided with power by the at least one adjustable speed generator. A second voltage source converter connected to an AC grid. A DC link is connected between the first and the second voltage source converter. At least one control unit controls the first and the second voltage source converters. The at least one control unit performs the method to control the AC voltage in the local AC bus via the first voltage source converter and to modify a reference value for the AC voltage magnitude of the local AC bus in dependence on the AC voltage magnitude of the AC grid.

BRIEF DESCRIPTION OF THE INVENTION

According to a first aspect of the invention, there is provided a power transmission network comprising: an AC electrical system; an AC transmission link for AC power transmission from the AC electrical system to at least one first AC-DC converter; at least one first AC-DC converter including: an AC connecting point operably connected to the AC transmission link; and a DC connecting point for connection to a DC transmission link; and a control system configured to operate the or each first AC-DC converter in an AC voltage control mode as an AC slack bus to control a magnitude and/or a frequency of an AC voltage of the AC transmission link at a or a respective steady-state value and thereby facilitate a power transfer (e.g. a variable or constant power transfer) between its AC and DC connecting points so as to accommodate a power (e.g. a variable or constant power) generated by or supplied to the AC electrical system, wherein the control system is further configured to operate the or each first AC-DC converter in a converter protection mode to regulate the or the respective steady-state value of the magnitude and/or frequency of the AC voltage of the AC transmission link to protect the or each first AC-DC converter from an overvoltage and/or an overcurrent.

The AC electrical system may be, but is not limited to, a variable power source, a dead AC electrical system, or a weak AC electrical system.

A variable power source may be any power source, such as an intermittent energy source, that is capable of generating a variable power. Examples of an intermittent energy source include, but are not limited to, a wind farm, a tidal farm and a solar farm.

Operation of the or each first AC-DC converter in the AC voltage control mode facilitates generation of a stable AC voltage waveform in the AC transmission link and thereby allows the AC electrical system to synchronise to the stable AC voltage waveform. Such synchronisation ensures that any power generated by or that is required to be supplied to the AC electrical system will be accommodated by the or each first AC-DC converter and thereby injected into or extracted from the DC transmission link.

Operation of the or each first AC-DC converter in the AC voltage control mode however results in the or each first AC-DC converter being rendered incapable of independently controlling the DC voltage and current at its DC connecting point and the AC current at its AC connecting point if all of the degrees of freedom available to the or each first AC-DC converter is used to operate the or each first AC-DC converter in the AC voltage control mode. Hence, during operation of the or each first AC-DC converter in the AC voltage control mode, the or each first AC-DC converter is incapable of independently limiting the DC voltage and current at its DC connecting point and the AC current at its AC connecting point, the values of which depends on the amount of power generated by or supplied to the AC electrical system.

In the event of a fault or other disturbance contributing to an increase in the DC voltage and/or current at its DC connecting point and/or the AC current at its AC connecting point, the or each first AC-DC converter being operated in the AC voltage control mode continues to absorb the power generated by the AC electrical system or supply power to the AC electrical system. This, together with the inability of the or each first AC-DC converter to independently limit the DC voltage and current at its DC connecting point and the AC current at its AC connecting point during its operation in the AC voltage control mode, could lead to an overvoltage and/or an overcurrent in the or each first AC-DC converter.

The inclusion of the control system in the power transmission network according to embodiments of the invention enables regulation of the or the respective steady-state value of the magnitude and/or frequency of the AC voltage of the AC transmission link to vary the power transfer between its AC and DC connecting points and thereby indirectly modify the DC voltage and/or current at its DC connecting point and/or the AC current at its AC connecting point in a manner that protects the or each first AC-DC converter from an overvoltage and/or overcurrent.

The ability of the control system to protect the or each first AC-DC converter from an overvoltage and/or an overcurrent therefore results in a more reliable power transmission network.

The control system is further configured to operate the or each first AC-DC converter in the converter protection mode to regulate the or the respective steady-state value of the magnitude and/or frequency of the AC voltage of the AC transmission link as a function of one or more power transmission parameters. For example, the control system may be further configured to operate the or each first AC-DC converter in the converter protection mode to regulate the or the respective steady-state value of the magnitude and/or frequency of the AC voltage of the AC transmission link as a function of: an alternating current at the AC connecting point of the or each first AC-DC converter; an AC voltage at the AC connecting point of the or each first AC-DC converter; a direct current at the DC connecting point of the or each first AC-DC converter; and/or a DC voltage at the DC connecting point of the or each first AC-DC converter.

In embodiments of the invention the power transmission network may include a control unit for operating the AC electrical system. The control system may be configured to coordinate the operation of the or each first AC-DC converter in the converter protection mode with a control objective of the control unit.

The control objective of the control unit may be an active and/or reactive power control mode of the AC electrical system. In the active and/or reactive power control mode, the control unit dispatches active and/or reactive reference values to the AC electrical system so that a power output of the AC electrical system meets a given power demand.

The reactive power control mode may include: reactive power control in which the reactive power output of the AC electrical system is maintained at a dispatched fixed level; power factor control in which the reactive power output of the AC electrical system follows the active power generation so as to maintain a dispatched constant power factor between the active and reactive power outputs of the AC electrical system; and/or voltage control in which the reactive power output of the AC electrical system follows the voltage of the AC transmission link so as to support the voltage stability of the power transmission network.

The active power control mode may include: maximum power point tracking in which the AC electrical system produces as much power as possible for a given time instance; active power control in which the active power output of the AC electrical system is maintained at a dispatched fixed level; and/or delta power operation in which the active power output of the AC electrical system is below the maximum level by a dispatched margin for a given time instance.

In further embodiments of the invention the control system may be configured to coordinate the operation of the or each first AC-DC converter in the converter protection mode with a disturbance response of the AC electrical system.

A disturbance response of the AC electrical system is a behaviour of the AC electrical system in response to the deviation in operating condition(s) of the AC electrical system from its normal value(s).

A disturbance response of the AC electrical system may include: over frequency power reduction or underfrequency power increase in which the AC electrical system is required to decrease or increase its active power output in proportion to the difference between the maximum frequency value allowed for the normal operation and the frequency of the AC voltage of the AC transmission link; and/or high voltage ride-through (HVRT) or low voltage ride-through (LVRT) in which the AC electrical system is required to maintain a connection to the rest of the power transmission network for abnormal AC voltage values as long as the measured AC voltage magnitude of the AC transmission link is within a pre-defined time-voltage band.

The disturbance response including HVRT or LVRT may further include the operation of the AC electrical system to override any received power command and switch into an autonomous control mode in which the AC electrical system directly controls the output current. In this regard the output current may be directly controlled by the AC electrical system to inject reactive current in a pre-defined proportion to the degree of voltage depression and at the same time to limit the injection of active current.

In still further embodiments of the invention the AC electrical system may be configured to decrease its power generation or consumption when the control system operates the or each first AC-DC converter in the converter protection mode. Configuration of the AC electrical system in this manner reduces the amount of power transmitted from/to the AC electrical system to/from the or each first AC-DC converter during the converter protection mode and thereby enhances the protection of the or each first AC-DC converter from an overvoltage and/or an overcurrent, thus improving the reliability of the power transmission network.

The power transmission network may be configured in various ways depending on its purpose.

In embodiments of the invention the power transmission network may include: an AC transmission link for AC power transmission from the AC electrical system to a first AC-DC converter; a first AC-DC converter including: a DC connecting point for connection to a DC transmission link; and an AC connecting point operably connected to the AC transmission link.

In use, the DC connecting point of the first AC-DC converter is operably connected to a DC transmission link for DC power transmission between a second AC-DC converter and a first AC-DC converter, and a second AC-DC converter includes: a DC connecting point operably connected to the DC transmission link; and an AC connecting point operably connected to an AC electrical network.

In this manner the power transmission network according to the embodiment configured in use as a point-to-point power transmission network.

The configuration of the control system may vary depending on specific requirements of the power transmission network. For example, the control system may include a global controller for controlling a plurality of converters, at least one local controller for controlling at least one converter, or a combination thereof. The global controller may be located remotely from each converter and may be configured to communicate with each converter via telecommunications links. The or each local controller may be located in the vicinity of at least one converter. The global controller may be configured to communicate with at least one local controller via telecommunications links.

According to a second aspect of the invention, there is provided a method of controlling a power transmission network. The power transmission network comprising: an AC electrical system; an AC transmission link for AC power transmission from the AC electrical system to at least one first AC-DC converter; and at least one first AC-DC converter including: an AC connecting point operably connected to the AC transmission link; and a DC connecting point for connection to a DC transmission link. The method comprises the steps of: operating the or each first AC-DC converter in an AC voltage control mode as an AC slack bus to control a magnitude and/or a frequency of an AC voltage of the AC transmission link at a or a respective steady-state value and thereby facilitate a power transfer between its AC and DC connecting points so as to accommodate a power generated by or supplied to the AC electrical system; and operating the or each first AC-DC converter in a converter protection mode to regulate the or the respective steady-state value of the magnitude and/or frequency of the AC voltage of the AC transmission link to protect the first AC-DC converter from an overvoltage and/or an overcurrent.

The advantages of the second aspect of the invention are described above with respect to the first aspect of the embodiments of the invention.

BRIEF DESCRIPTION OF THE DRAWINGS

Embodiments of the invention will now be described, by way of non-limiting examples, with reference to the accompanying drawings in which.

DETAILED DESCRIPTION OF THE DRAWINGS

Figure 1:
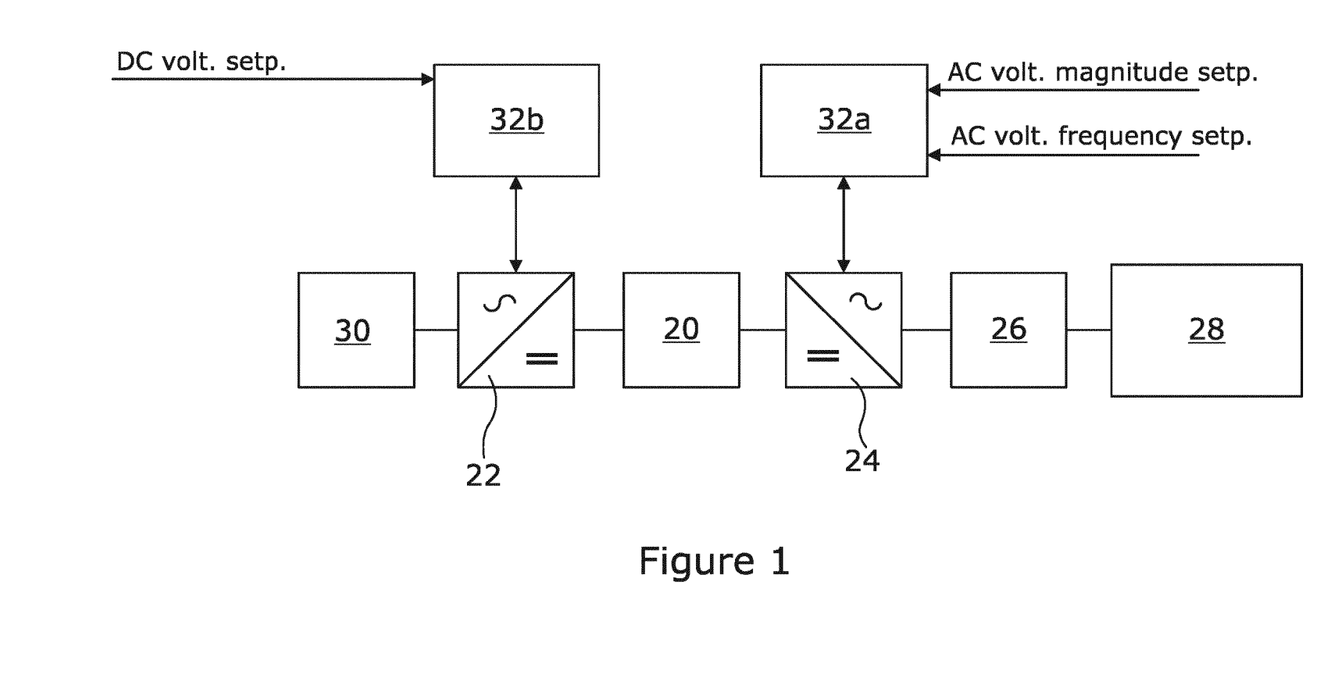
FIG. 1 shows, in schematic form, a power transmission network according to an embodiment of the invention.

A power transmission network according to an embodiment of the invention is shown in FIG. 1.

The power transmission network comprises: a DC transmission link 20 for DC power transmission between a second AC-DC converter 22 and a first AC-DC converter 24; an AC transmission link 26 for AC power transmission from a wind farm 28 to a first AC-DC converter 24; a wind farm 28; a first AC-DC converter 24 including: a DC connecting point connected to a first end of the DC transmission link 20; and an AC connecting point operably connected to the AC transmission link 26; a second AC-DC converter 22 including: an AC connecting point for connection to an AC power grid 30; and a DC connecting point connected to a second end to the DC transmission link 20.

In this manner the power transmission network is configured as a point-to-point power transmission network for interconnecting the wind farm 28 and the AC power grid 30.

Figure 2:
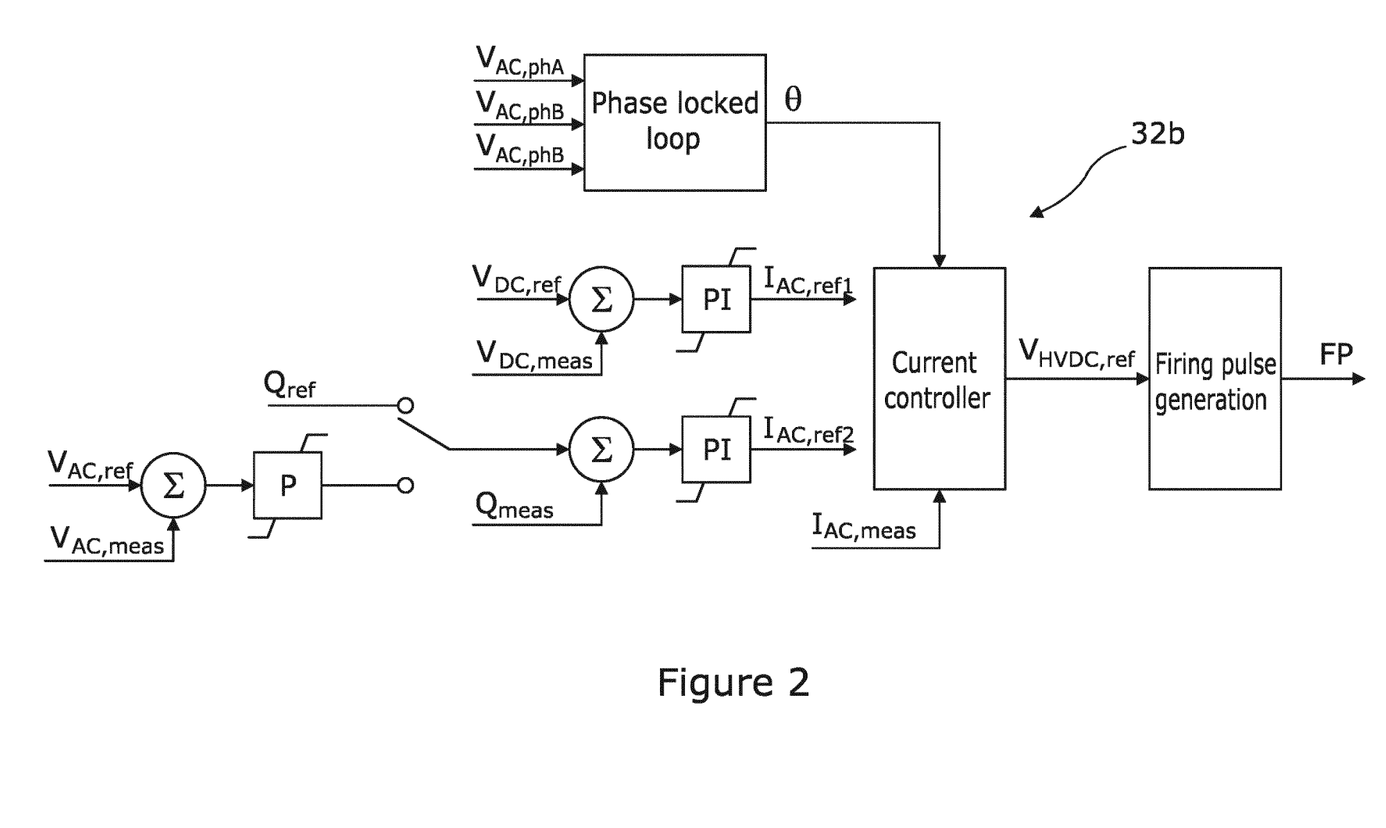
FIGS. 2 and 3 respectively show, in schematic form, the configuration of local controllers of the power transmission network of FIG. 1.
Figure 3:
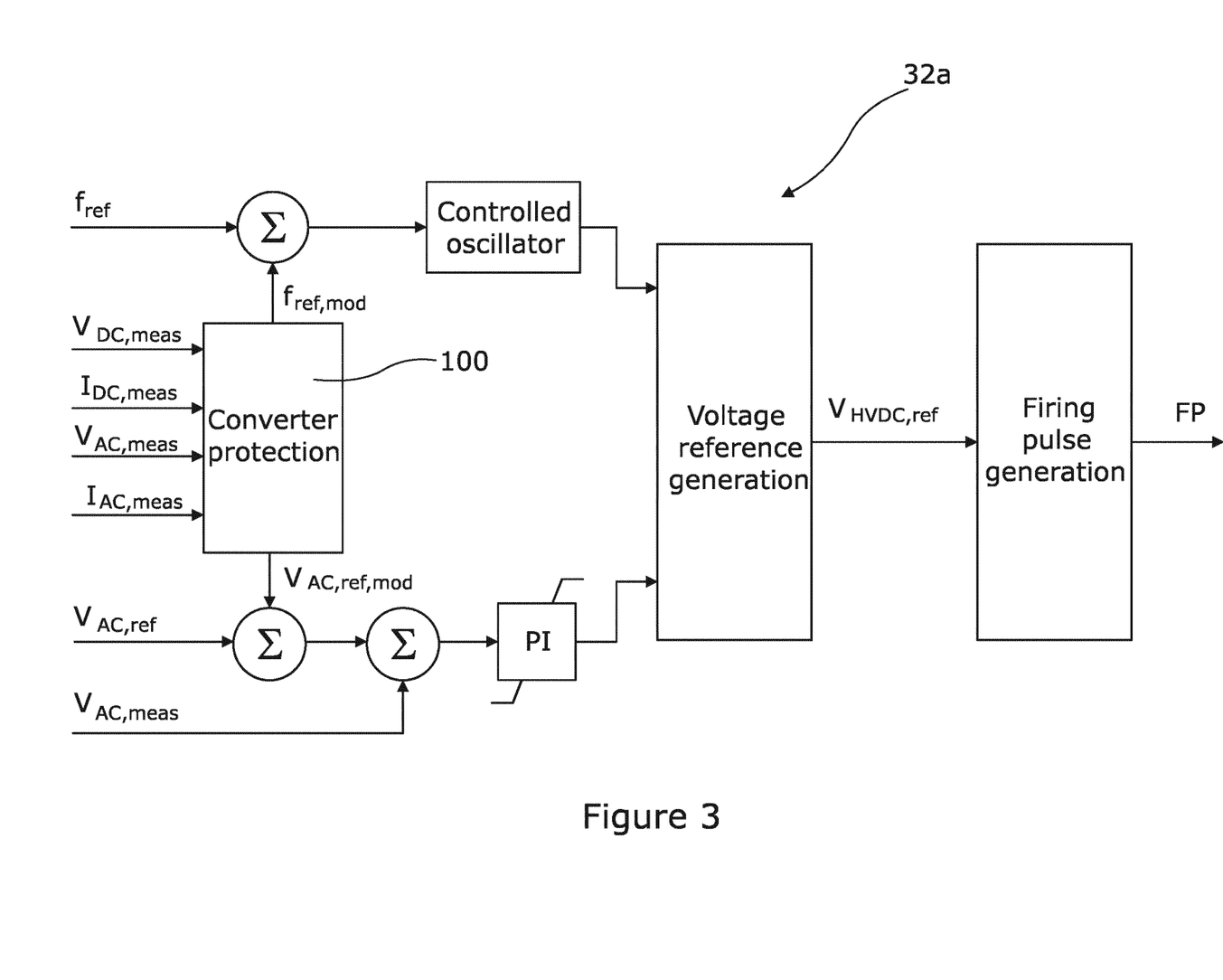

The power transmission network further includes a control system. The control system includes first and second local controllers 32a,32b for controlling the first and second AC-DC converters 24,22 respectively. Each local controller 32a,32b is located in the vicinity of the corresponding converter 24,22. FIGS. 2 and 3 respectively show, in schematic form, the configurations of the local controllers 32b, 32a for controlling the second and first AC-DC converters 22,24 respectively.

In use, the wind farm 28 generates a power into the AC transmission link 26. The AC transmission link 26 transmits the generated power to the AC connecting point of the first AC-DC converter 24. The first AC-DC converter 24 transfers the power from its AC connecting point to its DC connecting point, thus transferring power into the DC transmission link 20. The DC transmission link 20 transmits the generated power to the DC connecting point of the second AC-DC converter 22. The second AC-DC converter 22 transfers the power from its DC connecting point to its AC connecting point, thus transferring power into the AC power grid 30.

During operation of the power transmission network, a variation in power generated by the wind farm 28 may arise due to its intermittent nature.

For economic reasons, instead of controlling the amount of power generated by the wind farm 28, the power transmission network is configured to accommodate the variation in power generated by the wind farm 28, thereby transmitting all of the power generated by the wind farm 28 to the first AC-DC converter 24.

More particularly, the first local controller 32a is configured to operate the first AC-DC converter 24 in an AC voltage control mode as an AC slack bus to control a magnitude and frequency of an AC voltage of the AC transmission link 26 at a steady-state value and thereby facilitate a power transfer between its AC and DC connecting points to accommodate the power generated by the wind farm 28. Operation of the first AC-DC converter 24 in the AC voltage control mode facilitates generation of a stable AC voltage waveform in the AC transmission link 26 and thereby allows the wind farm 28 to synchronise to the stable AC voltage waveform. Such synchronisation ensures that any power generated by or supplied to the wind farm 28 will be accommodated by the first AC-DC converter 24 and thereby injected into or extracted from the DC transmission link 20 for subsequent transmission to the second AC-DC converter 22 and the AC power grid 30.

It is envisaged that, in other embodiments of the invention, the first local controller 32a may instead or additionally be configured to operate the first AC-DC converter 24 in an AC voltage control mode as an AC slack bus to control a magnitude and frequency of an AC voltage of the AC transmission link 26 at a steady-state value and thereby facilitate a constant power transfer between its AC and DC connecting points to accommodate a constant power generated by the wind farm 28.

The steady-state values of the magnitude and frequency of the AC voltage of the AC transmission link 26 are controlled by the first local controller 32a in accordance with pre-defined AC voltage magnitude and frequency reference values, $V_{AC,ref}, f_{ref}$. In other embodiments of the invention, the AC voltage magnitude and frequency reference values, $V_{AC,ref}, f_{ref}$ may instead be set by a higher level controller, e.g. a central grid controller. The operation of the first AC-DC converter 24 in an AC voltage control mode as an AC slack bus to control a frequency of an AC voltage of the AC transmission link 26 at a steady-state value is carried out using an open loop control, as shown in FIG. 3, but may also be carried out using a feedback control.

Operation of the first AC-DC converter 24 in the AC voltage control mode however means that the DC voltage at the DC connecting point of the first AC-DC converter 24 is uncontrolled. This is because the two degrees of freedom available to the first AC-DC converter 24 is used to operate the first AC-DC converter 24 in the AC voltage control mode as an AC slack bus to control a magnitude and frequency of an AC voltage of the AC transmission link 26 at a steady-state value.

The second local controller 32b is configured to operate the second AC-DC converter 22 in a DC voltage control mode as a DC slack bus to control a DC voltage at its DC connecting point. Operating the second AC-DC converter 24 in the DC voltage control mode facilitates a power transfer between its AC and DC connecting points to accommodate the power generated by the wind farm 28, thus enabling power transmission in the power transmission network.

It is envisaged that, in other embodiments of the invention, the second local controller may be configured to operate the second AC-DC converter to fix the DC voltage at its DC connecting point.

It will be understood that control of the DC voltage at the DC connecting point may be a direct result of the control of the DC voltage at the DC connecting point or be an indirect result of the control of another DC voltage at another point in the power transmission network.

Operation of the first AC-DC converter 24 in the AC voltage control mode results in the first AC-DC converter 24 being rendered incapable of independently controlling the DC voltage and current at its DC connecting point and the AC current at its AC connecting point. This is because, as mentioned earlier, the two degrees of freedom available to the first AC-DC converter 24 is used to operate the first AC-DC converter 24 in the AC voltage control mode. Hence, during operation of the first AC-DC converter 24 in the AC voltage control mode, the first AC-DC converter 24 is incapable of independently limiting the DC voltage and current at its DC connecting point and the AC current at its AC connecting point, the values of which depends on the amount of power generated by the wind farm 28.

In the event of a fault or other disturbance contributing to an increase in the DC voltage and/or current at its DC connecting point and/or the AC current at its AC connecting point, the first AC-DC converter 24 being operated in the AC voltage control mode continues to absorb all of the power generated by the wind farm 28. This, together with the inability of the first AC-DC converter 24 to independently limit the DC voltage and current at its DC connecting point and the AC current at its AC connecting point during its operation in the AC voltage control mode, could lead to an overvoltage and/or an overcurrent in the first AC-DC converter 24.

The first local controller 32a is further configured to operate the first AC-DC converter 24 in a converter protection mode to regulate the respective steady-state value of the magnitude and frequency of the AC voltage of the AC transmission link 26 to protect the first AC-DC converter 24 from an overvoltage and/or an overcurrent.

More specifically, the first local controller 32a is further configured to operate the first AC-DC converter 24 in the converter protection mode to regulate the respective steady-state value of the magnitude and frequency of the AC voltage of the AC transmission link 26 as a function of a plurality of power transmission parameters: an alternating current at the AC connecting point of the first AC-DC converter 24; an AC voltage at the AC connecting point of the first AC-DC converter 24; a direct current at the DC connecting point of the first AC-DC converter 24; and a DC voltage at the DC connecting point of the first AC-DC converter 24.

The first local controller 32a includes a converter protection control block 100 that is configured to receive measurements $V_{DC,meas}, I_{DC,meas}, V_{AC,meas}, I_{AC,meas}$ of the above plurality of power transmission parameters. The converter protection control block 100 is further configured to compare each of the received measurements $V_{DC,meas}, I_{DC,meas}, V_{AC,meas}, I_{AC,meas}$ with a respective protection reference value, which are dictated by the voltage and current ratings of the first AC-DC converter 24, and to generate AC voltage magnitude and frequency compensation signals $V_{AC,ref,mod}, f_{ref,mod}$. The converter protection control block 100 may be configured to generate the AC voltage magnitude and frequency compensation signals $V_{AC,ref,mod}, f_{ref,mod}$ when one or more of the received measurements $V_{DC,meas}, I_{DC,meas}, V_{AC,meas}, I_{AC,meas}$ exceeds, or is close to exceeding, the corresponding rating of the first AC-DC converter 24.

The first local controller 32a then combines the AC voltage magnitude and frequency compensation signals $V_{AC,ref,mod}, f_{ref,mod}$ with the AC voltage magnitude and frequency reference values $V_{AC,ref}, f_{ref}$ respectively so as to generate modified AC voltage magnitude and frequency reference values.

As the steady-state values of the magnitude and frequency of the AC voltage of the AC transmission link 26 are controlled by the first local controller 32a in accordance with the AC voltage magnitude and frequency reference values $V_{AC,ref}, f_{ref}$, the generation of the modified AC voltage magnitude and frequency reference values enables the first local controller 32a to operate the first AC-DC converter 24 to regulate the respective steady-state value of the magnitude and frequency of the AC voltage of the AC transmission link 26 to vary the power transfer between its AC and DC connecting points and thereby indirectly modify the DC voltage and/or current at its DC connecting point and/or the AC current at its AC connecting point in a manner that protects the first AC-DC converter 24 from an overvoltage and/or overcurrent.

The ability of the first local controller 32a to protect the first AC-DC converter 24 from an overvoltage and/or an overcurrent therefore results in a more reliable power transmission network.

Regulation of the respective steady-state value of the magnitude and frequency of the AC voltage of the AC transmission link 26 in the converter protection mode may be carried out as a function of some of the above plurality of power transmission parameters and/or one or more other power transmission parameters.

It is envisaged that, in other embodiments of the invention, the converter protection control block may be configured to generate only one of the AC voltage magnitude and frequency compensation signals $V_{AC,ref,mod}, f_{ref,mod}$.

Optionally the power transmission network may include a control unit for operating the wind farm 28. The first local controller 32a may be configured to coordinate the operation of the first AC-DC converter 24 in the converter protection mode with a control objective of the control unit. This results in a more responsive power transmission network.

The control objective of the control unit may be an active and/or reactive power control mode of the wind farm 28. In the active and/or reactive power control mode, the control unit dispatches active and/or reactive reference values to the wind farm 28 so that a power output of the wind farm 28 meets a given power demand.

The reactive power control mode may include: reactive power control in which the reactive power output of the wind farm 28 is maintained at a dispatched fixed level; power factor control in which the reactive power output of the wind farm 28 follows the active power generation so as to maintain a dispatched constant power factor between the active and reactive power outputs of the wind farm 28; and/or voltage control in which the reactive power output of the wind farm 28 follows the voltage of the AC transmission link 26 so as to support the voltage stability of the power transmission network.

The active power control mode may include: maximum power point tracking in which the wind farm 28 produces as much power as possible for a given time instance; active power control in which the active power output of the wind farm 28 is maintained at a dispatched fixed level; and/or delta power operation in which the active power output of the wind farm 28 is below the maximum level by a dispatched margin for a given time instance.

Further optionally the first local controller 32a may be configured to coordinate the operation of the first AC-DC converter 24 in the converter protection mode with a disturbance response of the wind farm 24.

A disturbance response of the wind farm 28 is a behaviour of the wind farm 28 in response to the deviation in operating condition(s) of the wind farm 28 from its normal value(s).

A disturbance response of the wind farm 28 may include: overfrequency power reduction or underfrequency power increase in which the wind farm 28 is required to decrease or increase its active power output in proportion to the difference between the maximum frequency value allowed for the normal operation and the frequency of the AC voltage of the AC transmission link 26; and/or high voltage ride-through (HVRT) or low voltage ride-through (LVRT) in which the wind farm 28 is required to maintain a connection to the rest of the power transmission network for abnormal AC voltage values as long as the measured AC voltage magnitude of the AC transmission link 26 is within a pre-defined time-voltage band.

The disturbance response including HVRT or LVRT may further include the operation of the wind farm 28 to override any received power command and switch into an autonomous control mode in which the wind farm 28 directly controls the output current. In this regard the output current may be directly controlled by the wind farm 28 to inject reactive current in a pre-defined proportion to the degree of voltage depression and at the same time to limit the injection of active current.

Coordination of the operation of the first AC-DC converter 24 in the converter protection mode with a disturbance response of the control unit can be realised by means of exchanging signals through a digital telecommunication system between the first local controller 32a and the control unit. In this case, if the first AC-DC converter 24 enters into the converter protection mode, a digital error message is automatically sent to the control unit. The error message prompts the wind farm 28 to temporarily override the received power commands and to modify its power, current or voltage output as is necessary to mitigate any overcurrent and/or any overvoltage in the first AC-DC converter 24.

In one example, if the reactive current injected by the first AC-DC converter 24 reaches its limit, the wind farm 24 might be requested to modify its reactive power, power factor or voltage setpoint. In another example, if the voltage on the DC side of the first AC-DC converter 24 reaches its limit, the wind farm 24 might be requested to reduce its active power output.

Depending on the type of the first AC-DC converter overcurrent and/or overvoltage, a different disturbance response might be required for a successful mitigation. Hence, for each type of disturbance response, an individual error message can be set.

Alternatively, the coordination of the operation of the first AC-DC converter 24 in the converter protection mode with a disturbance response of the control unit can be realised without a digital communication system by imposing through the first AC-DC converter 24 a certain AC voltage profile (in terms of voltage magnitude and frequency), which can be sensed and recognised by the control unit.

In one example, the converter protection mode of the first AC-DC converter 24 can be coordinated with the disturbance response of the wind farm 28 such that, if the measured voltage measured at the DC connecting point of the first AC-DC converter 24 reaches its limit, the converter protection mode could decrease the magnitude of the AC voltage of the AC transmission link 26 in order to force the wind farm 28 to undergo LVRT. In another example, if the first AC-DC converter 24 decreases the magnitude of the AC voltage of the AC transmission link 26 to a predefined level, the wind farm 28 could scale back its power generation at a rate and to a degree that is required for effective converter protection.

Such coordination between the operation of the first AC-DC converter 24 in the converter protection mode and the disturbance response of the control unit results in more effective protection of the power transmission network.

Still further optionally the wind farm 28 may be configured to decrease its power generation when the first local controller 32a operates the first AC-DC converter 24 in the converter protection mode. Configuration of the wind farm 28 in this manner reduces the amount of power transmitted from/to the wind farm 28 to/from the first AC-DC converter 24 during the converter protection mode and thereby enhances the protection of the first AC-DC converter 24 from an overvoltage and/or an overcurrent, thus improving the reliability of the power transmission network.

It is envisaged that, in other embodiments of the invention, the wind farm 28 may be replaced by another type of variable power source, such as a tidal or solar farm, and/or the AC power grid may be replaced by another type of AC electrical network.

In still other embodiments of the invention, the wind farm 28 may be replaced by another type of AC electrical system.

One such AC electrical system for replacing the wind farm 28 may be a dead AC electrical network in which all of its electrical components are de-energised and dissipative in nature, i.e. they do not generate active or reactive power but instead consume active and/or reactive power if supplied with an AC voltage. In other words each electrical component of a dead AC electrical system becomes an electrical load that requires a supply of power in order to perform their expected action. Such supply of power may be carried out by the first AC-DC converter 24.

One example of a dead AC electrical system is an oil platform, which comprises an array of cables and transformers to distribute energy to effective loads, such as induction motors and platform lightning. Another example of a dead AC electrical system is an AC power transmission system that experienced a black-out whereby all of the associated generator stations are either tripped and de-energised or disconnected from the AC power transmission system. A further example of a dead AC electrical system is an AC collector system for an offshore wind farm, which comprises transformers, shunt reactors and submarine AC cables.

To operate the dead AC electrical system, the first AC-DC converter 24 must be operated to first energise the passive components of the dead AC electrical system that distribute/transmit the power from a power source to the effective loads. Such energisation is carried out by way of a black start operation, during which the first AC-DC converter is operated in an AC voltage control mode as an AC slack bus to establish and maintain the voltage of the dead AC electrical system at a desired magnitude and frequency, so that the associated effective loads can operate correctly.

Since the first AC-DC converter 24 is operated in an AC voltage control mode as an AC slack bus with respect to the dead AC electrical system, the control system can also operate the first AC-DC converter 24 in the above-described converter protection mode to regulate the steady-state values of the magnitude and frequency of the AC voltage of the AC transmission link to protect the first AC-DC converter 24 from an overvoltage and/or an overcurrent. In other words the above-described application of the embodiments of the invention to the power transmission network of FIG. 1 including the wind farm 28 applies mutatis mutandis to the power transmission network including the dead AC electrical system.

Another such AC electrical system for replacing the wind farm 28 may be a weak AC electrical system in which the rated power of connected synchronous generators is relatively small and any disturbance in the weak AC electrical system results in significant voltage magnitude and frequency variations.

One example of a weak AC electrical system is an AC power transmission system located on a small island with only a single or very few conventional power plants (such as gas fired power plants or diesel generators) to supply power to consumers. Another example of a weak AC electrical system is an AC power transmission system that undergoes a restoration sequence to recover from a black-out when only a sub-set of the associated conventional power plants are synchronised and in operation.

When a weak AC electrical system is connected to a stronger AC electrical system via the source-side converter 24, its resilience against electrical disturbances can be increased by operating the first AC-DC converter 24 in an AC voltage control mode as an AC slack bus to establish and maintain the voltage of the weak AC electrical system at a desired magnitude and frequency. Hence, if the weak AC electrical system is disturbed and requires a surge of power to maintain its stability, the first AC-DC converter 24 acting as an AC slack bus will automatically supply the weak AC electrical system with extra power from the stronger AC electrical system. However, as the amount of extra energy is dictated by the nature of the disturbance, severe disturbance cases could result in the supply of excessive power that results in the first AC-DC converter 24 experiencing an overvoltage and/or an overcurrent.

Since the first AC-DC converter 24 is operated in an AC voltage control mode as an AC slack bus with respect to the weak AC electrical system, the control system can also operate the first AC-DC converter 24 in the above-described converter protection mode to regulate the steady-state values of the magnitude and frequency of the AC voltage of the AC transmission link to protect the first AC-DC converter 24 from an overvoltage and/or an overcurrent.

In other words the above-described application of the embodiments or the invention to the power transmission network of FIG. 1 including the wind farm 28 applies mutatis mutandis to the power transmission network including the weak AC electrical system.

It will be appreciated that embodiments of the invention are applicable to any power transmission network with any configuration that includes one or more first AC-DC converters that is controlled as an AC slack bus.

The configuration of the control system may vary depending on specific requirements of the power transmission network. In one example, in place of the local controllers, the control system may include a global controller for controlling the first and second AC-DC converters, and the global controller may be configured to communicate with each converter via telecommunications links. In another example, in addition to the local controllers, the control system may include the global controller for controlling the first and second AC-DC converters, and the global controller may be configured to communicate with at least one local controller via telecommunications links.

It will be appreciated that the configuration of the local controllers were merely chosen to help illustrate the operation of the embodiments of the invention, and that each of the local controllers may be replaced by another type of controller with a different configuration. It will also be appreciated that the input values received by the control system shown in FIGS. 2 and 3 were merely chosen to help illustrate the operation of the embodiments of the invention, that not all of the input values are required for the control system to carry out its function, and that other types of input values may be provided to the control system in order for it to carry out its function.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power transmission network comprising:
   an AC electrical system;
   an AC transmission link for AC power transmission from the AC electrical system to at least one first AC-DC converter;
   the at least one first AC-DC converter including: an AC connecting point operably connected to the AC transmission link; and a DC connecting point for connection to a DC transmission link; and
   a control system configured to:
     operate the or each first AC-DC converter in an AC voltage control mode as an AC slack bus to control a magnitude and a frequency of an AC voltage of the AC transmission link at a or a respective steady-state value and thereby facilitate a power transfer between its AC and DC connecting points so as to accommodate a power generated by or supplied to the AC electrical system;
     operate the or each first AC-DC converter in a converter protection mode to regulate the or the respective steady-state value of the magnitude and frequency of the AC voltage of the AC transmission link to protect the or each first AC-DC converter from an overvoltage and/or an overcurrent; and
     operate the or each first AC-DC converter in the converter protection mode to regulate the or the respective steady-state value of the magnitude and frequency of the AC voltage of the AC transmission link as a function of one or more power transmission parameters, the one or more power transmission parameters comprising:
       an alternating current at the AC connecting point of the or each first AC-DC converter;
       an AC voltage at the AC connecting point of the or each first AC-DC converter;
       a direct current at the DC connecting point of the or each first AC-DC converter; and/or
       a DC voltage at the DC connecting point of the or each first AC-DC converter.

2. The power transmission network according to claim 1, wherein the AC electrical system is a variable power source, a dead AC electrical system, or a weak AC electrical system.

3. The power transmission network according to claim 1, including a control unit for operating the AC electrical system, wherein the control system is configured to coordinate the operation of the or each first AC-DC converter in the converter protection mode with a control objective of the control unit.

4. The power transmission network according to claim 1, wherein the control system is configured to coordinate the operation of the or each first AC-DC converter in the converter protection mode with a disturbance response of the AC electrical system.

5. The power transmission network according to claim 1, wherein the AC electrical system is configured to decrease its power generation or consumption when the control system operates the or each first AC-DC converter in the converter protection mode.

6. The power transmission network according to claim 1, wherein the control system includes a global controller for operating a plurality of converters, at least one local controller for operating at least one converter, or a combination thereof.

7. A method of controlling a power transmission network, the power transmission network comprising:
- an AC electrical system;
- an AC transmission link for AC power transmission from the AC electrical system to at least one first AC-DC converter; and
- at least one first AC-DC converter including: an AC connecting point operably connected to the AC transmission link; and a DC connecting point for connection to a DC transmission link; and
- wherein the method comprises:
  - operating the or each first AC-DC converter in an AC voltage control mode as an AC slack bus to control a magnitude and a frequency of an AC voltage of the AC transmission link at a or a respective steady-state value and thereby facilitate a power transfer between its AC and DC connecting points so as to accommodate a power generated by or supplied to the AC electrical system;
  - operating the or each first AC-DC converter in a converter protection mode to regulate the or the respective steady-state value of the magnitude and frequency of the AC voltage of the AC transmission link to protect the first AC-DC converter from an overvoltage and/or an overcurrent; and
  - operate the or each first AC-DC converter in the converter protection mode to regulate the or the respective steady-state value of the magnitude and frequency of the AC voltage of the AC transmission link as a function of one or more power transmission parameters, the one or more power transmission parameters comprising:
    - an alternating current at the AC connecting point of the or each first AC-DC converter;
    - an AC voltage at the AC connecting point of the or each first AC-DC converter;
    - a direct current at the DC connecting point of the or each first AC-DC converter; and/or
    - a DC voltage at the DC connecting point of the or each first AC-DC converter.

\* \* \* \* \*